(12) United States Patent
Kadota

(10) Patent No.: US 9,769,345 B2
(45) Date of Patent: Sep. 19, 2017

(54) INFORMATION PROCESSING APPARATUS, METHOD OF CONTROLLING THE SAME AND NON-TRANSITORY COMPUTER READABLE MEDIUM

(71) Applicant: CANON KABUSHIKI KAISHA, Tokyo (JP)

(72) Inventor: Eiji Kadota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/154,116

(22) Filed: May 13, 2016

(65) Prior Publication Data

US 2016/0352929 A1    Dec. 1, 2016

(30) Foreign Application Priority Data

May 29, 2015  (JP) ................................. 2015-110808

(51) Int. Cl.
*G06F 3/12*     (2006.01)
*H04N 1/00*    (2006.01)
*G06K 15/02*   (2006.01)

(52) U.S. Cl.
CPC ......... *H04N 1/0097* (2013.01); *G06K 15/021* (2013.01); *H04N 1/00204* (2013.01); *H04N 1/00973* (2013.01); *H04N 2201/0094* (2013.01)

(58) Field of Classification Search
USPC ....................................................... 358/1.15
See application file for complete search history.

(56) References Cited

U.S. PATENT DOCUMENTS

| | | | |
|---|---|---|---|
| 2007/0223024 A1* | 9/2007 | Takesada ............... | G06F 3/1204 358/1.13 |
| 2008/0094659 A1* | 4/2008 | Ito ......................... | G06F 3/1204 358/1.15 |
| 2008/0240765 A1* | 10/2008 | Shida ................. | G03G 15/5029 399/79 |
| 2010/0085591 A1* | 4/2010 | Arai ...................... | G06K 15/02 358/1.13 |
| 2013/0232152 A1* | 9/2013 | Dhuse ............... | G06F 17/30321 707/741 |
| 2014/0344289 A1* | 11/2014 | Berenson .............. | G06F 1/3293 707/751 |

(Continued)

FOREIGN PATENT DOCUMENTS

JP            2002-297343 A        10/2002

*Primary Examiner* — Jerome Grant, II
(74) *Attorney, Agent, or Firm* — Fitzpatrick, Cella, Harper & Scinto

(57) ABSTRACT

An information processing apparatus receives a change of a parameter included in media characteristic information, causes, from media characteristic information held by a storage, the parameter for which the change is received to be held as custom media characteristic information, the apparatus performs an update of the media characteristic information held by the storage in accordance with new media characteristic information and decides, if an update of the custom media characteristic information is to be performed by using the new media characteristic information, whether to hold, or to update without holding, the parameter for which the change is received, based on a difference in configuration between the custom media characteristic information held by the storage and the new media characteristic information.

16 Claims, 7 Drawing Sheets

(56) References Cited

U.S. PATENT DOCUMENTS

| | | | |
|---|---|---|---|
| 2015/0106748 A1* | 4/2015 | Monte | G06F 3/0482 |
| | | | 715/753 |
| 2015/0121381 A1* | 4/2015 | Chen | G06F 8/70 |
| | | | 718/102 |
| 2015/0206035 A1* | 7/2015 | Yamashita | G06F 3/1204 |
| | | | 358/1.9 |

* cited by examiner

```
<media1>0001</media1>
<media1name> NORMAL PAPER </media1name>
<media2>0002</media2>
<media2name> POSTCARD </media2name>
<media3>0003</media3>
<media3name> ENVELOPE </media3name>
<media4>0004</media4>
<media4name> COATED PAPER </media4name>
<media5>0005</media5>
<media5name> PHOTO PAPER </media5name>
<media6>0006</media6>
<media6name> MATTE PAPER </media6name>
...
```

| | |
|---|---|
| 0001 | NORMAL PAPER |
| 0002 | POSTCARD |
| 0003 | ENVELOPE |
| 0004 | COATED PAPER |
| 0005 | PHOTO PAPER |
| 0006 | MATTE PAPER |
| ... | ... |

FIG. 7

| | | 208 |
|---|---|---|
| STRUCTURE VERSION | 1.010 | |
| DEFAULT GRADE | 10 | |
| PRINT MODE | 5 | |
| TRAILING EDGE KICK STEP DELAY | 6 | |
| SCAN INTERVAL DELAY | 6 | |
| PAGE INTERVAL DELAY (CUT SHEET) | 7 | |
| APPLICATION AMOUNT RANK | 5 | |
| FEED METHOD ASF | 1 | |
| FEED METHOD MANUAL FEED (Renoir TYPE) | 0 | |
| DEFAULT SHEET-TO-SHEET INTERVAL POSITION | 5 | |
| SHEET THICKNESS | 10 | |
| SHEET GRAMMAGE | 5 | |

FIG. 8

| | | 800 |
|---|---|---|
| SCAN INTERVAL DELAY | 8 | |
| PAGE INTERVAL DELAY (CUT SHEET) | 9 | |

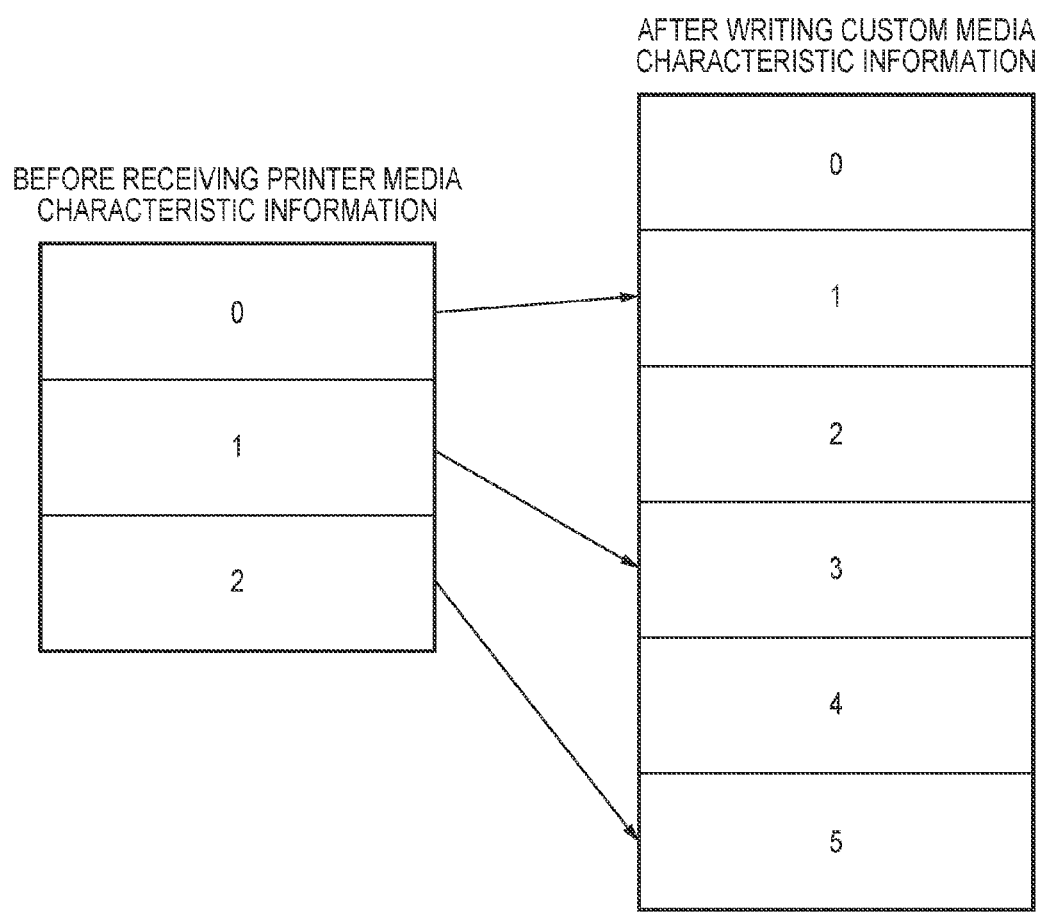

ics for each medium. However, for example, if the control information for each medium depends on an installation environment, such as a temperature or a humidity level, an optimal value may not be achieved with control information that is uniformly defined for each medium due to a specific environment. As a counter-measure to such a case in which the control information depends on the installation environment, there are cases in which specific item of the control information for each medium are changed individually from a UI of a printing apparatus, unlike when updating by a media update program. By changing a specific item of the control information for each medium, even if there are differences in installation environments for example, it is possible to execute printing by appropriate control information for a user.

INFORMATION PROCESSING APPARATUS, METHOD OF CONTROLLING THE SAME AND NON-TRANSITORY COMPUTER READABLE MEDIUM

BACKGROUND OF THE INVENTION

Field of the Invention

The present invention relates to an information processing apparatus, a method of controlling the same, and a non-transitory computer readable medium.

Description of the Related Art

In a printing apparatus that supports many types of mediums (recording mediums), control information for hardware or a profile used in image processing changes depending on the medium. Thus, firmware or a printer driver of the printing apparatus internally holds control information for each medium. In addition, there are cases in which the printing apparatus or the printer driver must support a new medium after sales have started for the printing apparatus. Therefore, the firmware or the printer driver of the printing apparatus holds control information for each medium in a structure that is separated from software. Control information for the firmware or the printer driver for each medium is updated by a media update program. By employing such a configuration, even if a medium needs to be newly supported after sales of the printing apparatus have started, it is possible for a manufacturer to support it without performing a version update operation for the firmware or the printer driver, which would require a large workload (refer to Japanese Patent Laid-Open No. 2002-297343).

By employing a configuration that uses the above-described media update program to update control information for each medium, it is possible to absorb differences of characteristics for each medium. However, for example, if the control information for each medium depends on an installation environment, such as a temperature or a humidity level, an optimal value may not be achieved with control information that is uniformly defined for each medium due to a specific environment. As a counter-measure to such a case in which the control information depends on the installation environment, there are cases in which specific item of the control information for each medium are changed individually from a UI of a printing apparatus, unlike when updating by a media update program. By changing a specific item of the control information for each medium, even if there are differences in installation environments for example, it is possible to execute printing by appropriate control information for a user.

However, in a case of changing a specific item of the control information for each medium from the UI of the printing apparatus, if the control information is updated by the media update program after the specific item is changed, the parameter that the user changed may be overwritten. In such a case, there is the problem in that the user must change the parameter again, and a burden on the user who uses the printing apparatus becomes larger. In addition, if the user forgets content of the changed parameter, there is the problem that the original environment cannot be returned to.

SUMMARY OF THE INVENTION

According to one aspect of the present invention, there is provided an information processing apparatus comprising: a receiving unit configured to receive a change of a parameter included in media characteristic information; a holding control unit configured to cause, from media characteristic information held by a storage unit, the parameter for which the change is received by the receiving unit to be held as custom media characteristic information; an obtaining unit configured to obtain new media characteristic information; an updating unit configured to perform an update of the media characteristic information held by the storage unit in accordance with the new media characteristic information obtained by the obtaining unit; and a decision unit configured to decide, if an update of the custom media characteristic information is to be performed by using the new media characteristic information obtained by the obtaining unit, whether to hold, or to update without holding, the parameter for which the change is received by the receiving unit, based on a difference in configuration between the custom media characteristic information held by the storage unit and the new media characteristic information obtained by the obtaining unit, wherein the updating unit updates the parameter for which the change is received by the receiving unit if the decision unit decides to update.

According to another aspect of the present invention, there is provided a method of controlling an information processing apparatus, the method comprising: receiving a change of a parameter included in media characteristic information; causing, from media characteristic information held by a storage unit, the parameter for which the change is received to be held as custom media characteristic information; obtaining new media characteristic information; performing an update of the media characteristic information held by the storage unit in accordance with the obtained new media characteristic information; and deciding, if an update of the custom media characteristic information is to be performed by using the obtained new media characteristic information, whether to hold, or to update without holding, the parameter for which the change is received, based on a difference in configuration between the custom media characteristic information held by the storage unit and the obtained new media characteristic information, wherein the parameter for which the change is received is updated if the decision is made to update.

According to another aspect of the present invention, there is provided a non-transitory computer readable medium storing a program for causing a computer to function as: a receiving unit configured to receive a change of a parameter included in media characteristic information; a holding control unit configured to cause, from media characteristic information held by a storage unit, the parameter for which the change is received by the receiving unit to be held as custom media characteristic information; an obtaining unit configured to obtain new media characteristic information; an updating unit configured to perform an update of the media characteristic information held by the storage unit in accordance with the new media characteristic information obtained by the obtaining unit; and a decision unit configured to decide, if an update of the custom media characteristic information is to be performed by using the new media characteristic information obtained by the obtaining unit, whether to hold, or to update without holding, the parameter for which the change is received by the receiving unit, based on a difference in configuration between the custom media characteristic information held by the storage unit and the new media characteristic information obtained by the obtaining unit, wherein the updating unit updates the parameter for which the change is received by the receiving unit if the decision unit decides to update.

By virtue of the present invention, even if control information is updated by an updating program, re-setting of a specific item that a user has separately changed before the updating becomes unnecessary.

Further features of the present invention will become apparent from the following description of exemplary embodiments (with reference to the attached drawings).

BRIEF DESCRIPTION OF THE DRAWINGS

FIG. 5 is a view illustrating an example of a printer media characteristic information header.

FIG. 6 is a view illustrating an example of a media list.

FIG. 7 is a view illustrating an example of printer media characteristic information.

FIG. 8 is a view illustrating an example of custom media characteristic information.

FIG. 9 is a view for explaining changing a format in accordance with media characteristic information of a new structure.

DESCRIPTION OF THE EMBODIMENTS

Figure 1:
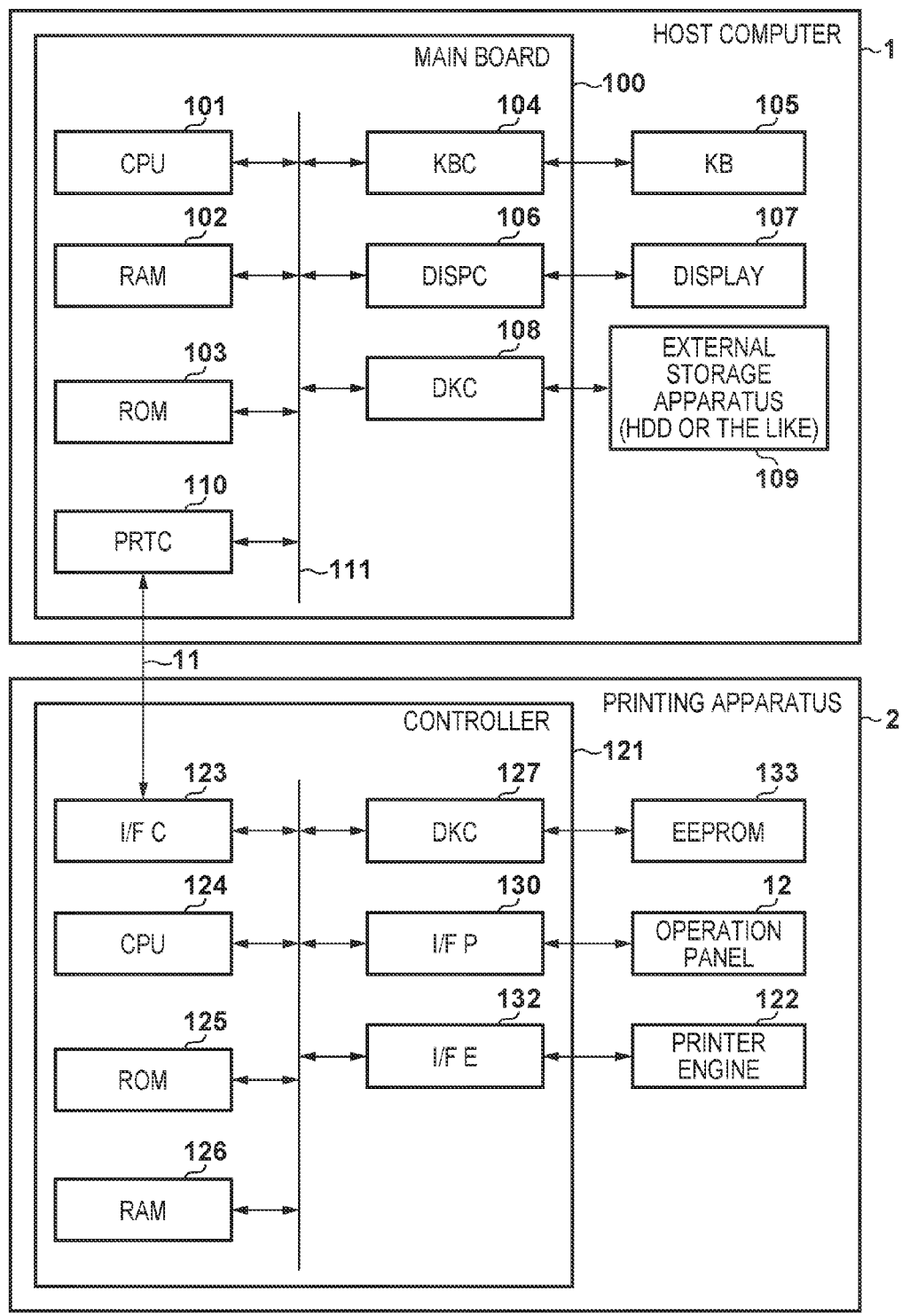
FIG. 1 is a view illustrating an example configuration of a printing system according to the present application invention.

Below, an embodiment of this invention is explanatorily explained in detail while referring to the drawings. However, a configuration recited in the present embodiment is merely an embodiment, and is not something that limits the scope of the invention thereto.

[System Configuration]

FIG. 1 illustrate an example configuration of a printing system according to embodiments of the present invention. The printing system includes a host computer 1 and a printing apparatus 2. Note that the printing apparatus 2 may be a single-function printer or an MFP (Multi-Function Peripheral), and is not particularly limited to an ink-jet approach or an electrophotographic printing approach. The present invention can be adopted, if the printing apparatus is one in which at least one of driver media characteristic information that a printer driver on the host computer 1 uses, or printer media characteristic information that is used on the printing apparatus 2 side is provided for each medium. The media characteristic information here is information regarding media that the printing apparatus supports. A concrete example will be explained later by using the drawings.

The host computer 1 and the printing apparatus 2 are connected to allow communication therebetween via a bi-directional interface 11. As the bi-directional interface 11, for example USB, IEEE 1394, TCP/IP, or the like are given. Note that, for the host computer 1, a personal computer (PC) or the like is given as a representative example of an information processing apparatus.

The host computer 1 has a main board 100, a keyboard (KB) 105, a display 107 such as an LCD, and an external storage apparatus 109. For the external storage apparatus 109, a hard disk (HDD), a floppy disk (FDD) or the like are given.

The main board 100 further has a CPU 101, a RAM 102, a ROM 103, a keyboard controller (KBC) 104, a display controller (DISPC) 106, a disk controller (DKC) 108, and a printer controller (PRTC) 110. Each component in the main board 100 is connected to a system bus 111.

The CPU 101 comprehensively controls each component, and executes various programs stored in the ROM 103 or the like. The keyboard controller 104 controls input/output with the keyboard 105 or a pointing device (not shown). The keyboard controller 104 is also referred to as an operation unit or an input unit. The display controller 106 controls display of the display 107. The RAM 102 is a volatile storage region, and functions as a main memory or a work area of the CPU 101. The ROM 103 is a non-volatile storage region, and stores, for example, a program or various data used in data control or setting. The external storage apparatus 109 stores, for example, an operating system (OS), and a printer control command generation program (hereinafter, a printer driver), a user file, various applications, a boot program, and a program for executing various functions according to the present application invention.

The disk controller 108 controls access with the external storage apparatus 109, which is a hard disk, a floppy disk, or the like. The printer controller 110 is connected to the printing apparatus 2 via the bi-directional interface 11, and controls processing for communication of data and commands with the printing apparatus 2.

The printing apparatus 2 has a controller 121, a printer engine 122, an operation panel 12, and a non-volatile storage apparatus 133. The nonvolatile storage apparatus is also referred to as a non-volatile memory.

The controller 121 includes a CPU 124, a ROM 125, a RAM 126, an interface controller (I/FC) 123, disk controller (DKC) 127, a panel interface (I/FP) 130, and an engine interface (I/FE) 132.

The CPU 124 executes various programs stored in the non-volatile storage apparatus 133 or the like. The ROM 125 stores various programs or various data. The RAM 126 is used as a work area in which various data or various programs are temporarily stored. Here, data includes image data for printing, and commands include a command for printing, or a command that changes a setting of the printer.

The interface controller 123 is connected to the host computer 1 via the bi-directional interface 11, and controls processing for communication of data and commands with the host computer 1. The non-volatile storage apparatus 133 stores, for example, data from the host computer 1 and attached information regarding that data, or information of the printing apparatus itself that is used at a time of a print operation. For the non-volatile storage apparatus 133, an example that uses an EEPROM is illustrated here. The disk controller 127 controls access to the non-volatile storage apparatus 133. The panel interface 130 controls input/output with respect to the operation panel 12. The engine interface 132 controls the printer engine 122 to realize appropriate printing. The printer engine 122 is a print unit that performs printing.

Figure 2:
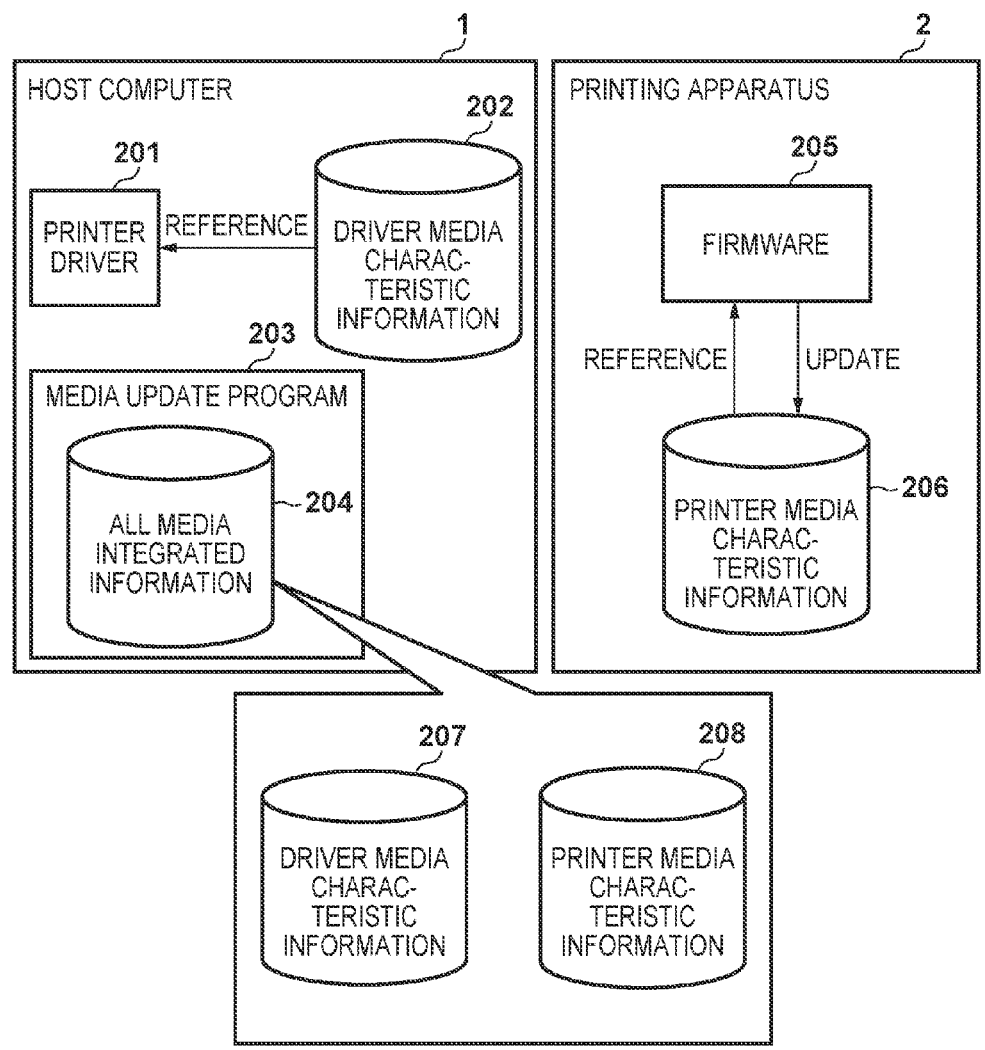
FIG. 2 is a view illustrating an overview of a functional configuration of the printing system.

FIG. 2 illustrates an overview of a functional configuration of the printing system. In an environment in which the printing apparatus 2 is connected to the host computer 1, the printer driver 201 of the host computer 1 sends to the printing apparatus 2 information required for printing, such as image data, a print control command, a media ID, and an image processing profile. In contrast, based on the information sent from the printer driver 201, the printing apparatus 2 performs image processing or hardware control, to perform print processing.

The host computer 1 holds driver media characteristic information 202 independently from data of the printer driver 201 main unit. The driver media characteristic information 202 is various parameters relating to media that the printer driver 201 uses. The printer driver 201 refers to the driver media characteristic information 202, and then performs control for selectably displaying media names or various printing designations, which are displayed on a user interface (UI; not shown). In addition, the printer driver 201 obtains from the driver media characteristic information 202 parameters to send at a time of printing.

The printing apparatus 2 holds printer media characteristic information 206 in the non-volatile memory 133, independently from data of a firmware 205 main unit. The printer media characteristic information 206 is various parameters relating to media that the firmware 205 uses (in other words, that the printing apparatus 2 can support). The firmware 205 refers to the printer media characteristic information 206 to control display to the operation panel 12. In addition, the firmware 205 obtains parameters used in control of printing at a time of printing. In addition, from parameters of items included in the printer media characteristic information 206, parameters of items that can be changed can be updated by setting them from the operation panel 12. Here, items that can be changed may be defined in advance.

In the present embodiment, a user operates the operation panel 12 to change a parameter of a changeable item of the printer media characteristic information 206 held in the printing apparatus 2. Explanation is given of a use case in which thereafter a media update program 203 is used to update, in accordance with new printer media characteristic information 208, the printer media characteristic information 206 held in the printing apparatus 2.

The media update program 203 is provided by including all media integrated information 204 from a vendor of the printing apparatus 2, for example. The all media integrated information 204 includes new driver media characteristic information 207 and the printer media characteristic information 208, which are used in an update. Note that the new driver media characteristic information 207 is used in the process for updating the driver media characteristic information 202 held in the host computer 1. In addition, as a presupposition of the present application invention, the printing apparatus 2 holds and manages the custom media characteristic information in addition to the printer media characteristic information. The custom media characteristic information is something that holds the item and parameter in association in a case where a user has performed a setting change with respect to a respective item included in the printer media characteristic information held by the printing apparatus 2. The printing apparatus 2 is something that performs various processing by preferentially using a parameter set in the custom media characteristic information, if performing print processing or the like.

[Process Flow]

Figure 3:
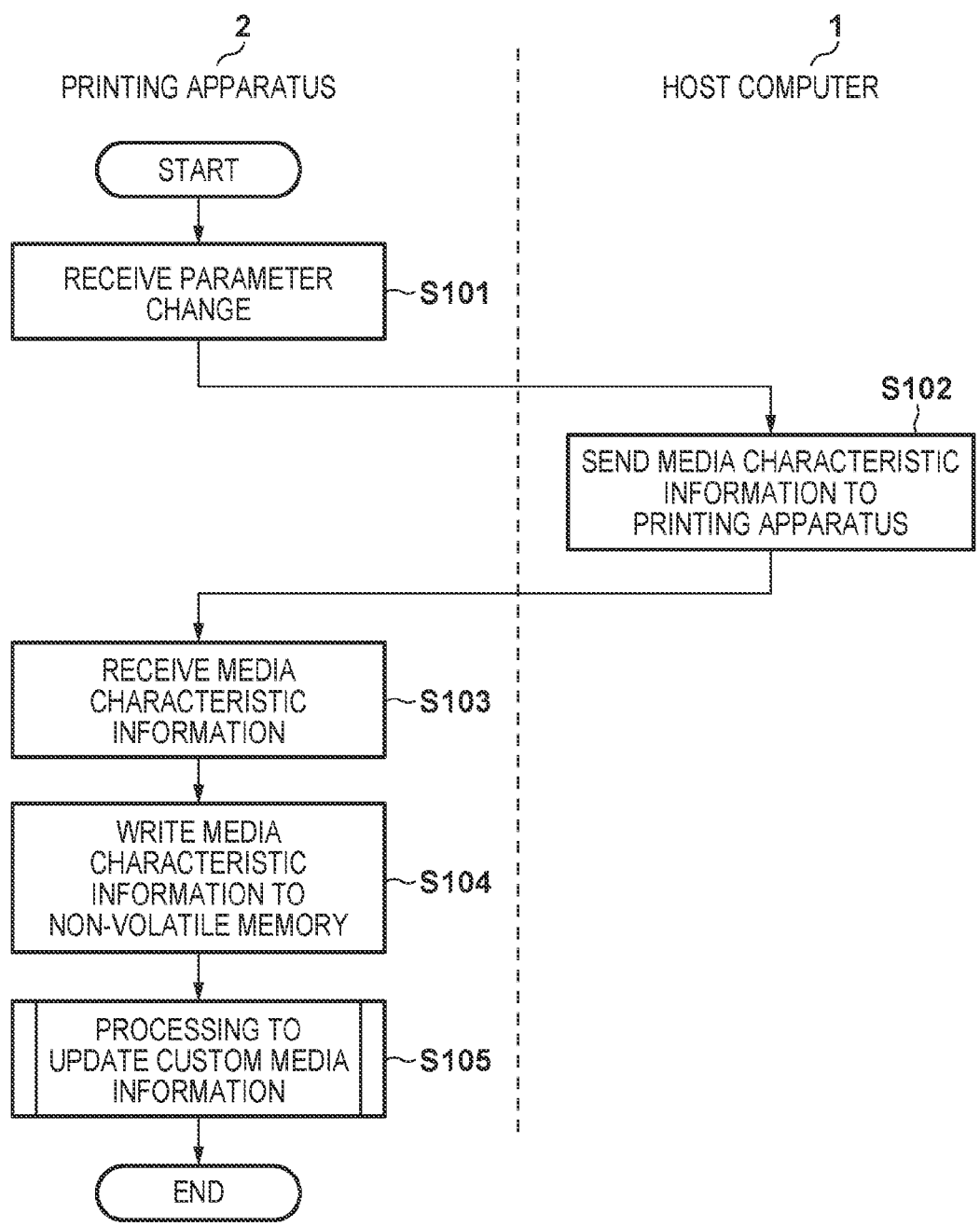
FIG. 3 is a flowchart of processing according to the present application invention.
Figure 4:
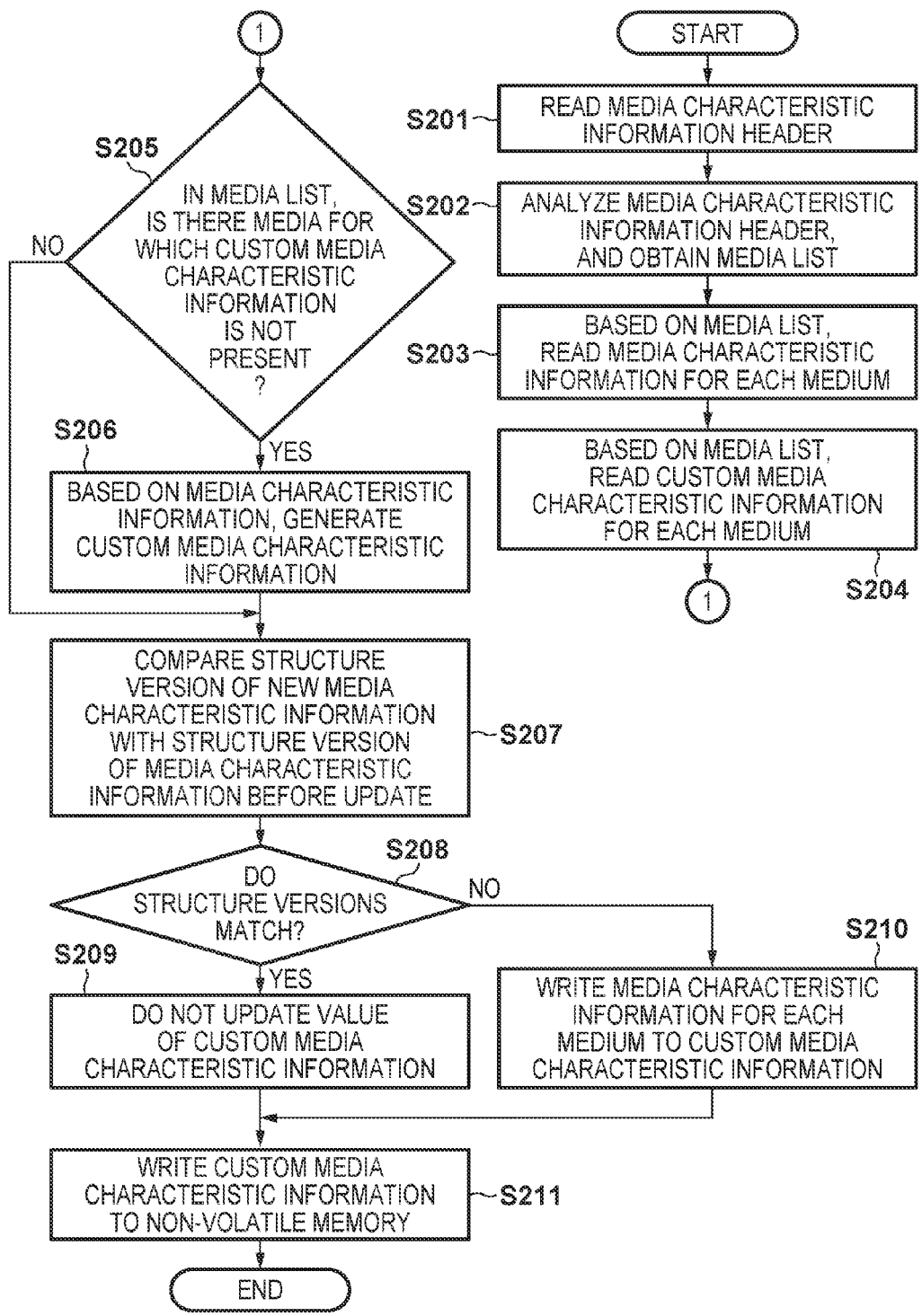
FIG. 4 is a flowchart of a process for updating custom media information according to the present application invention.

Using FIG. 3 and FIG. 4, an explanation of processing according to the present embodiment is performed. FIG. 3 is processing for when new printer media characteristic information 208 is used to execute an update of the printer media characteristic information 206, after a parameter of an item in the printer media characteristic information 206 is changed from the operation panel 12 of the printing apparatus 2. This processing is realized by the CPUs of respective apparatuses reading and executing respective programs stored in storage units (including the media update program 203).

In step S101, in accordance with a user instruction via the operation panel 12, the printing apparatus 2 changes parameters of a portion of items in the printer media characteristic information 206, which is saved in the non-volatile memory 133 in the printing apparatus 2. The printing apparatus 2 displays a setting screen (not shown) as a receiving unit on the operation panel 12, and receives a setting change via the setting screen. At this point, the printing apparatus 2 holds information of a changed item and a value thereof (parameter) as custom media characteristic information.

In step S102, the host computer 1 sends to the printing apparatus 2 the printer media characteristic information 208 which is to be used in update processing. For the sending here, configuration may be taken such that, for example, sending is automatically performed when the host computer 1 obtains a media update program that includes new media characteristic information, or sending is performed based on an update instruction of a user.

In step S103, the printing apparatus 2 receives the printer media characteristic information 208 sent from the host computer 1.

In step S104, the printing apparatus 2 updates the printer media characteristic information by writing the received printer media characteristic information 208 into the non-volatile memory 133.

In step S105, the printing apparatus 2 performs processing for updating the custom media characteristic information. Here, this processing is explained in detail using FIG. 4. Next, this processing flow is terminated. Note that if the printing apparatus 2 performs print processing, it is performed by using the updated printer media characteristic information, and the custom media characteristic information.

Using FIG. 4, an explanation of processing for updating the custom media characteristic information is given in detail. In step S201, the printing apparatus 2 reads a printer media characteristic information header 500 from the printer media characteristic information 208 held in the non-volatile memory 133. As illustrated in FIG. 5, media information that the printing apparatus 2 can support is saved in the printer media characteristic information header 500.

In step S202, the printing apparatus 2 analyzes the media information saved in the printer media characteristic information header 500, and obtains a media list 600 as in FIG. 6. The media list 600 covers one or a plurality of types of media that the printing apparatus 2 can support.

In step S203, with respect to all media held in the media list 600, the printing apparatus 2 reads from the non-volatile memory 133 printer media characteristic information, such as is illustrated in FIG. 7, for each medium. As illustrated in FIG. 7, the media characteristic information includes parameters relating to print processing operation or media characteristics.

In step S204, with respect to all media held in the media list 600, the printing apparatus 2 reads from the non-volatile memory 133 the custom media characteristic information 800, such as is illustrated in FIG. 8, for each medium. Before the printer media characteristic information is updated, the custom media characteristic information indicates values and items of parameters that have been changed by the user in step S101. Note that, in the custom media characteristic information, values of items not changed by a user remain as an initial value.

In step S205, as a result of reading the custom media characteristic information in step S204, the printing apparatus 2 confirms, from media included in the media list 600, whether there is any for which the custom media characteristic information is not present. Media for which the custom media characteristic information is not present corresponds, for example, to a media type added when the printer media characteristic information is updated in step S104, as a media type that the printing apparatus can newly support. If there is media for which the custom media characteristic information is not present (YES in step S205), the processing proceeds to step S206; if there is no media for which the custom media characteristic information is not present (NO in step S205), the processing proceeds to step S207.

In step S206, the printing apparatus 2 generates custom media characteristic information with respect to media for which it has been determined that the custom media characteristic information is not present. Generation of the custom media characteristic information is performed based on detail of the printer media characteristic information 208 newly obtained as an update target. For initial parameters of each item at a time of generation of the custom media characteristic information, parameters of the newly obtained printer media characteristic information 208 are set.

In step S207, the printing apparatus 2 compares value of a structure version specified in the newly obtained printer media characteristic information 208 with a value of a structure version that was set in the existing printer media characteristic information 206 by using the firmware 205. The structure version here indicates a version of a configuration of the media characteristic information. The structure version is defined in accordance with addresses at which parameters of the printer media characteristic information and the custom media characteristic information are arranged, ranges of values that the parameters can take, or the like, for example. Therefore, a value of a structure version is also changed when these structures are changed. However, a structure version is not limited to this definition, and configuration may be taken such that updating is performed in accordance with another change, such as an increase or decrease of setting items, for example. If the structure versions match (YES in step S208), the processing proceeds to step S209; if they do not match (NO in step S208), the processing proceeds to step S210.

In step S209, the printing apparatus 2 does not update parameters of the custom media characteristic information. In other words, if the structure version is not changed by an update of the printer media characteristic information, a parameter changed by a user is held. Thereafter, the processing proceeds to step S211.

In step S210, the printing apparatus 2 writes parameters of the printer media characteristic information 208, as illustrated in FIG. 7, to the custom media characteristic information. In other words, if the structure version has been changed, initialization is performed by values of the new printer media characteristic information, without holding the parameters changed by the user. Thereafter, the processing proceeds to step S211.

In step S211, the printing apparatus 2 writes the custom media characteristic information to the non-volatile memory 133. Next, this processing flow is terminated.

Note that, in the foregoing, although an example in which a determination based on a structure version is performed in step S208 and then a parameter changed in accordance with the result of the determination continues to be held was illustrated, limitation is not made to this. For example, configuration may be taken such that, at a time of an update of printer media characteristic information, a user is notified that a parameter has previously changed, and control to update the custom media characteristic information is performed in accordance with an instruction from a user at that time. In such a case, configuration may be taken so as to display a value of a parameter that was changed in association with a value of a parameter indicated by new media characteristic information.

In addition, configuration may be taken so, when updating to new printer media characteristic information, to change the format and value for values of the held custom media characteristic information to match the media characteristic information having the new structure. For example, in the example of FIG. 9, three values, 0 to 2, can be set as a parameter of an item in printer media characteristic information before an update. However, in new printer media characteristic information, six values, 0 to 5, can be set. The value "2" of the printer media characteristic information before the update corresponds to the value "5" of the new printer media characteristic information. In such a case, if "2" is set in the custom media characteristic information, the custom media characteristic information may be updated to hold "5" when performing an update by the new printer media characteristic information.

As explained above, by the present application invention it is possible for a printing apparatus to hold a parameter set by a user.

The present invention is not limited to the above described embodiment. In addition, although a printing apparatus was given as an example of an information processing apparatus, there is no limitation to this, and it may be another apparatus. For example, the present invention can also be applied when updating media from one computer to another computer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110808, filed May 29, 2015, which is hereby incorporated by reference herein in its entirety.

What is claimed is:

1. An information processing apparatus comprising:
one or more processors operating to:
(a) receive a change of a parameter included in media characteristic information held in a storage unit, the change being in accordance with a user instruction;
(b) cause a part of media characteristic information corresponding to the changed parameter to be held, in the storage unit, as custom media characteristic information;
(c) obtain new media characteristic information for an update;
(d) perform an update of the media characteristic information other than the custom media characteristic information held in the storage unit, based on the obtained new media characteristic information; and
(e) decide, in a case that an update of the custom media characteristic information is to be performed based on the obtained new media characteristic information, whether to hold, or to update without holding, the changed parameter, based on a difference in configuration between the custom media characteristic information held in the storage unit and the obtained new media characteristic information,
wherein the changed parameter is held if it is decided to hold the changed parameter, and the changed parameter is updated without holding if it is decided to update without holding the changed parameter.

2. The information processing apparatus according to claim 1, wherein the changed parameter is held if the configurations are the same, and the changed parameter is updated without holding if the configurations are not the same.

3. The information processing apparatus according to claim 1, wherein the one or more processors further operate to notify a user that the change has been received if the update of the media characteristic information using the obtained new media characteristic information is performed, and
wherein, based on a user instruction, it is decided whether to hold, or update without holding, the parameter that was changed with respect to the received media characteristic information.

4. The information processing apparatus according to claim 3, wherein the user is notified of a parameter value in association with a parameter value of the obtained new media characteristic information.

5. The information processing apparatus according to claim 1, wherein a parameter of the media characteristic information for which the change was received is updated, by fitting to a format of the obtained new media characteristic information.

6. The information processing apparatus according to claim 1, wherein, in the storage unit, the custom media characteristic information is held in association with the media characteristic information parameter.

7. The information processing apparatus according to claim 1, wherein the one or more processors further operate to:
determine whether there is media for which the custom media characteristic information is not present, from among media included in a media list obtained from updated media characteristic information, and
generate, based on the updated media characteristic information, custom media characteristic information with respect to the media for which it is determined that the custom media characteristic information is not present.

8. The information processing apparatus according to claim 1, wherein the one or more processors further operate to perform print processing based on the media characteristic information held in the storage unit.

9. A method of controlling an information processing apparatus, the method comprising:
receiving a change of a parameter included in media characteristic information held in a storage unit, the change being in accordance with a user instruction;
causing, a part of media characteristic information corresponding to the changed parameter to be held, in the storage unit, as custom media characteristic information;
obtaining new media characteristic information for an update;
performing an update of the media characteristic information other than the custom media characteristic information held in the storage unit, based on the obtained new media characteristic information; and
deciding, in a case that an update of the custom media characteristic information is to be performed based on the obtained new media characteristic information, whether to hold, or to update without holding, the changed parameter, based on a difference in configuration between the custom media characteristic information held in the storage unit and the obtained new media characteristic information,
wherein the changed parameter is held if it is decided to hold the changed parameter, and the changed parameter is updated without holding if it is decided to update without holding the changed parameter.

10. The method according to claim 9, wherein the changed parameter is held if the configurations are the same, and the changed parameter is updated without holding if the configurations are not the same.

11. The method according to claim 9, further comprising notifying a user that the change has been received if the update of the media characteristic information using the obtained new media characteristic information is performed,
wherein, based on a user instruction, it is decided whether to hold, or update without holding, the parameter that was changed with respect to the received media characteristic information.

12. The method according to claim 9, a parameter of the media characteristic information for which the change was received is updated by fitting to a format of the obtained new media characteristic information.

13. A non-transitory computer readable medium storing a program for causing a computer to perform a method comprising:
receiving a change of a parameter included in media characteristic information held in a storage unit, the change being in accordance with a user instruction;
causing a part of media characteristic information corresponding to the changed parameter to be held, in the storage unit, as custom media characteristic information;
obtaining new media characteristic information for an update;
performing an update of the media characteristic information other than the custom media characteristic information held in the storage unit, based on the obtained new media characteristic information; and deciding, in a case that an update of the custom media characteristic information is to be performed based on the obtained new media characteristic information, whether to hold, or to update without holding, the changed parameter, based on a difference in configuration between the custom media characteristic information held in the storage unit and the obtained new media characteristic information, wherein the changed parameter is held if it is decided to hold the changed parameter, and the changed parameter is updated without holding if it decided to update without holding the changed parameter.

14. The non-transitory computer readable medium according to claim 13, wherein the changed parameter is held if the configurations are the same, and the changed parameter is updated without holding if the configurations are not the same.

15. The non-transitory computer readable medium according to claim 13, wherein the method further comprises notifying a user that the change has been received if the update of the media characteristic information using the obtained new media characteristic information is performed, wherein, based on a user instruction, it is decided whether to hold, or update without holding, the parameter that was changed with respect to the received media characteristic information.

16. The non-transitory computer readable medium according to claim 13, a parameter of the media characteristic information for which the change was received is updated by fitting to a format of the obtained new media characteristic information.

* * * * *